United States Patent [19]

Fenn

[11] Patent Number: 4,673,579
[45] Date of Patent: Jun. 16, 1987

[54] METHOD OF DRYING PLANTS HAVING STEMS AND LEAVES

[75] Inventor: George S. Fenn, Elkton, Oreg.

[73] Assignee: Fenn & Company, Cottage Grove, Oreg.

[21] Appl. No.: 575,789

[22] Filed: Feb. 1, 1984

Related U.S. Application Data

[62] Division of Ser. No. 256,106, Apr. 21, 1981, Pat. No. 4,448,707.

[51] Int. Cl.$^4$ ............................................. A23L 3/34
[52] U.S. Cl. .................................. 426/321; 426/310; 426/541
[58] Field of Search ............... 426/310, 321, 541, 335; 252/194, 400 R, 407

[56] References Cited

U.S. PATENT DOCUMENTS

| | | | |
|---|---|---|---|
| 3,812,269 | 5/1974 | Mueller et al. | 426/335 |
| 3,846,567 | 11/1974 | Matyas et al. | 426/321 |

FOREIGN PATENT DOCUMENTS

| | | | |
|---|---|---|---|
| 2614495 | 10/1977 | Fed. Rep. of Germany | 426/335 |
| 7406041 | 11/1974 | Netherlands | 426/335 |

OTHER PUBLICATIONS

Handbook of Food Additives, 2nd Edition, vol. I, CRS Press, Inc., 1972, p. 624.
Condensed Chemical Dictionary, Eighth Edition, Reinhold Company, 1971, p. 783.

Primary Examiner—George Yeung
Attorney, Agent, or Firm—Ellsworth R. Roston; Charles H. Schwartz

[57] ABSTRACT

Material for drying cut plants includes a drying agent providing a basic pH of at least 11 and becoming at least partially insoluble at a pH no greater than approximately 13.4. Such agent saponifies the wax on the stems as the plant dries and as the pH of the drying agent accordingly increases. Such agent is selected from a group consisting of the carbonates, phosphates and silicates, and a combination of the hydroxides, carbonates and bicarbonates, of at least one of sodium and potassium. The drying agent may have a concentration of about 3 to 6 pounds per ton of dried cut plants. The material also includes a mold inhibiting agent having properties of remaining inactive until the occurrence in the plant of conditions inducing molding and of then reacting with the moisture to inhibit mold formation. Such agent may be selected from a group consisting of acids and acid salts of at least one of propionic, acetic, sorbic, carboxylic and other fatty acids. Such agent may have a concentration between approximately 2½ and 5 pounds per ton of dried cut plants. The plants may be bent, and the material may then be applied to the plants, to facilitate the direction of a spray along the stems and leaves of the plants. After the plants are cut, the plants may be assembled into a high, loosely packed windrow or the plants may be laid flat on the ground. When the plants in the windrow have dried, the windrow is turned over and is baled shortly thereafter.

31 Claims, 5 Drawing Figures

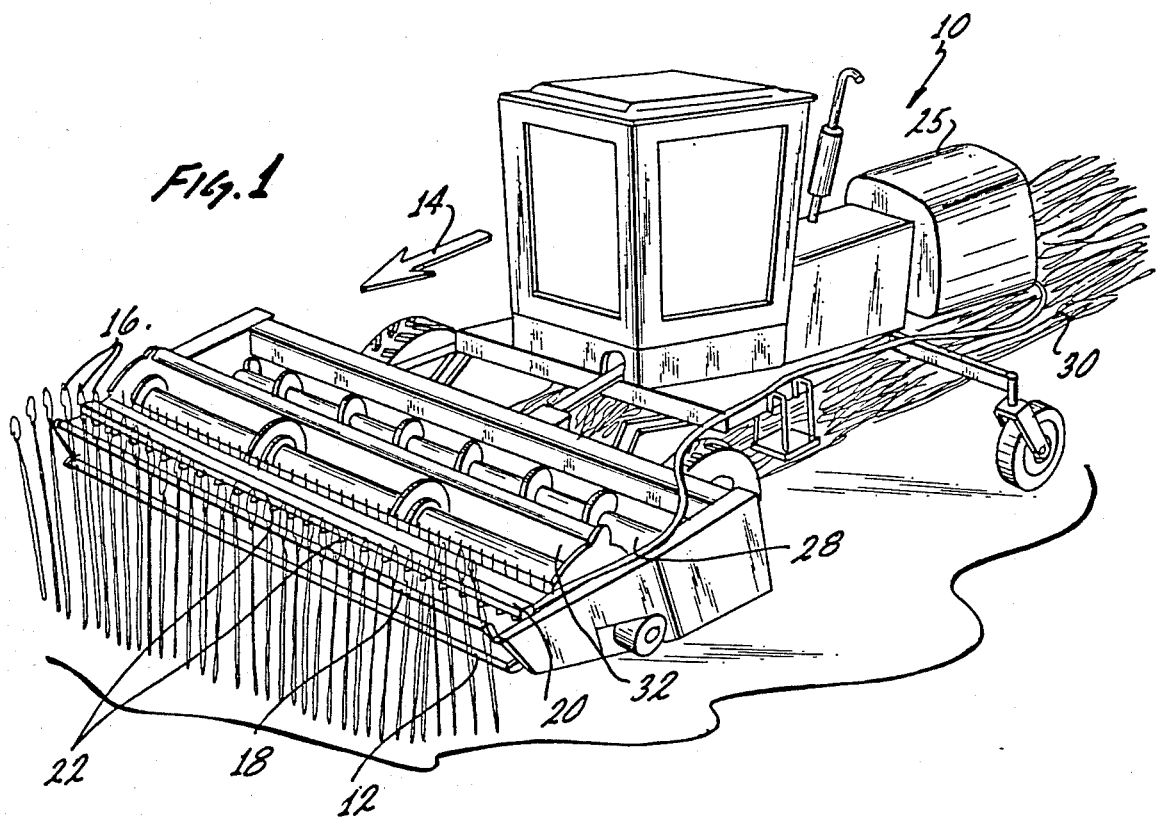
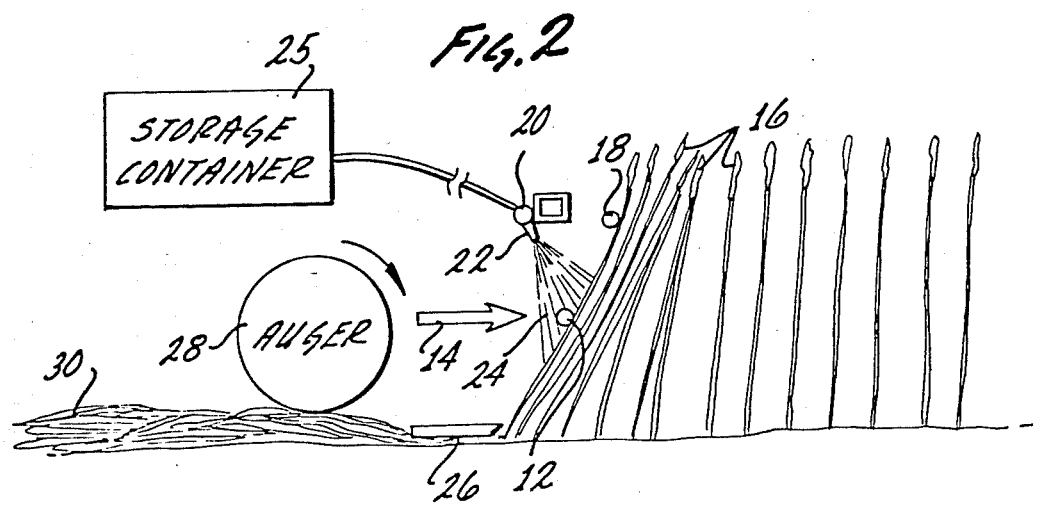

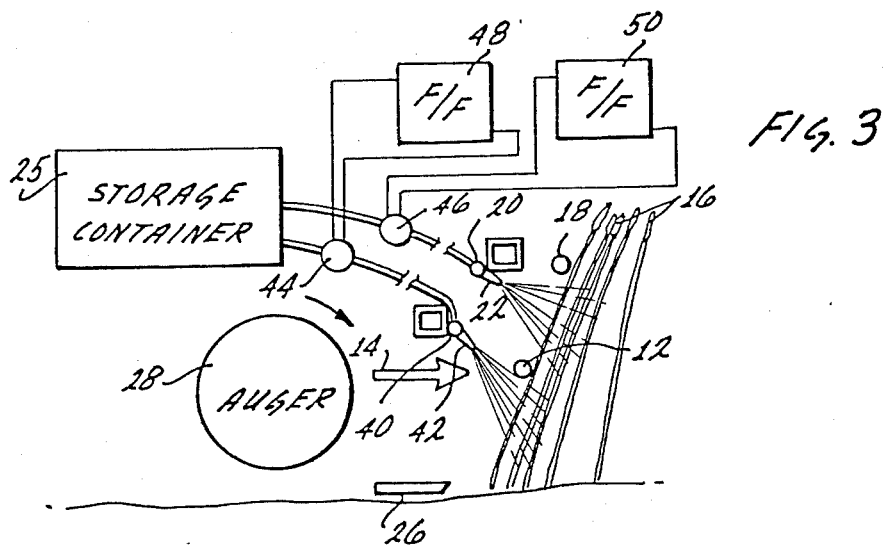
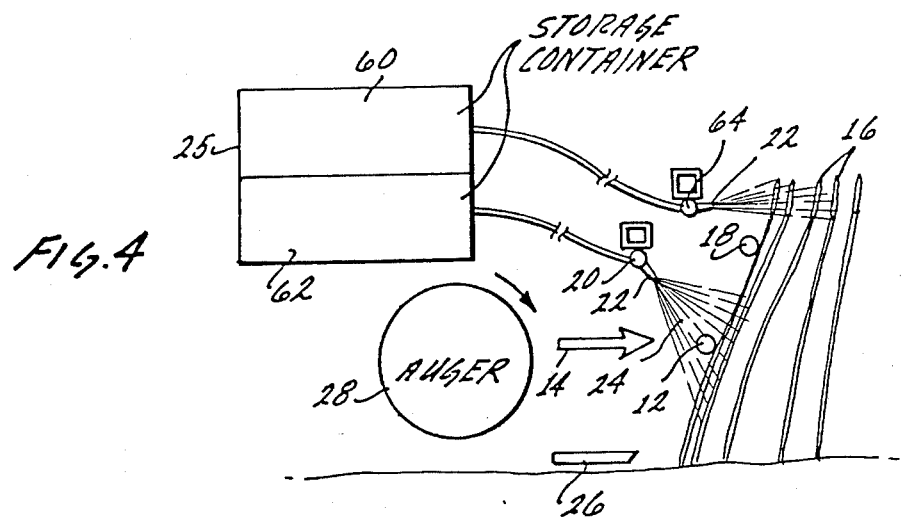
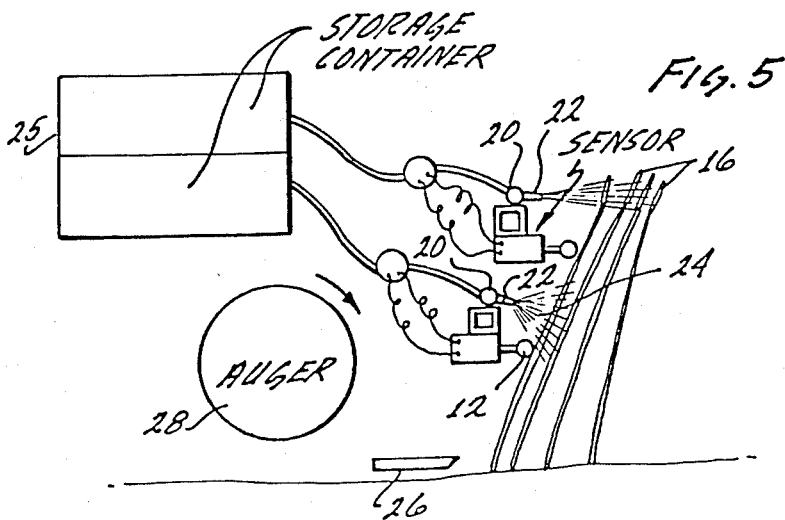

METHOD OF DRYING PLANTS HAVING STEMS AND LEAVES

This is a division of application Ser. No. 256,106, filed Apr. 21, 1981, now U.S. Pat. No. 4,448,707.

This invention relates to materials for drying cut plants such as grass or alfalfa and other types of legumes to prevent such plants from molding. The invention also relates to methods of drying such plants. The invention further relates to apparatus for bending the plants before cutting, spraying the plants along the full height of the plants and cutting the plants at the stems.

Cut plants such as grass or alfalfa and other types of legume are used during the winter months to provide feed for farm animals such as horses and cows. The plants are cut and then dried in the sun for a few days to reduce, and hopefully minimize, moisture. It is important to eliminate, or at least reduce, the moisture because the plants otherwise tend to mold.

Various attempts have been made to reduce, and hopefully eliminate, the moisture in cut plants. Such efforts have not been successful. This has been particularly true because the leaves on the cut plants tend to dry faster than the stems. The differences in the rates of drying have existed in part because the stems are more bulky than the leaves and the leaves are more delicate than the stems. It has also resulted in part from the fact that the stems have wax coatings which inhibit the operation of any drying agent in removing moisture from the plants.

There are also other problems which inhibit the proper drying of the cut plants. For example, when the plants are cut, they tend to be deposited in windrows for drying by the sun and the wind. The moisture content at different positions in the window tends to vary over considerable limits. Furthermore, the rate of drying of the cut plants at the different positions in the windrow is not uniform. As a result, all of the cut plants do not become dry at the same time. This has caused positions of moisture to exist in the windrow and these positions of moisture have produced molding, particularly of the leaves. The molding of the leaves then tends to spread so that the plants are no longer usable as feed.

The problems of improper drying have particularly existed with respect to legumes such as alfalfa because of their leafy characteristics. This has been particularly unfortunate because the nutritional properties of legumes such as alfalfa are well known. In spite of the considerable effort which has been devoted to drying such cut plants as alfalfa and other types of legumes, approximately forty percent (40%) of the crop in such cut plants as alfalfa and other types of legumes has been lost each year as a result of the deleterious effects of moisture.

This invention provides materials which overcome the disadvantages discussed above. The materials produce a drying of the cut plants, particularly along the stems of the plants, and produce a chemical reaction with the moisture, particularly on the leaves, to inhibit molding when conditions for molding of the leaves exist. The invention also provides apparatus for producing an effective spraying of the drying agent and the mold inhibitor on the plants.

The material of this invention includes a drying agent providing a basic pH in a solution of at least 11 and having properties of becoming at least partially insoluble in the solution at a pH of no greater than approximately 13.4. The drying agent has properties of saponifying the wax on the stems as the plant dries and as the pH of the drying agent accordingly increases. The drying agent is selected from a group consisting of the carbonates, phosphates and silicates of at least one of sodium and potassium and a combination of the hydroxides, carbonates and bicarbonates of at least one of sodium and potassium. The drying agent may have a concentration of about 3 to 6 pounds per ton of dried cut plants.

The material also includes a mold inhibiting agent having properties of remaining inactive until the occurrence in the plant of conditions inducing molding and having properties of reacting with the moisture, under conditions of temperature and moisture inducing molding, to inhibit the formation of the mold. The mold inhibiting agent may be selected from a group consisting of acids and acid salts of at least one of propionic, sorbic and carboxylic acids and other fatty acids. The agent may have a concentration between approximately $2\frac{1}{2}$ and 5 pounds per ton of dried cut plants for one type of mold inhibitor and may have a concentration of approximately 0.005 to 0.25 pounds per ton of dried cut plants for another type of mold inhibitor.

The material may be applied to plants, before the plants are cut, by bending the plants to facilitate the direction of a spray of the solution along the stems and leaves of the plants. After the plants are cut, the plants may be assembled into a high, loosely packed windrow. When the plants in the plants in the windrow have dried, the windrow are turned over and the windrow is baled shortly thereafter. Alternatively, the plants may be laid flat on the ground. If desired, the plants may thereafter be assembled into a loose pile constituting the equivalent of a windrow.

Apparatus is included in the invention for bending, spraying and cutting the plants. Such apparatus may include means for controlling, as by digital techniques, the rate at which the material in the solution is sprayed on the plants. The apparatus may include means for spraying a first solution on the stems and a second solution on the leaves. The first solution may contain primarily the drying agent and the second solution may contain primarily the mold inhibiting agent. Apparatus may also be included for controlling the rate of spraying the fluid at each instant in accordance with the mass of the plants being sprayed at that instant. Apparatus may be further included for squeezing the plants, after cutting and spraying, to enhance the affectiveness of the drying agent and the mold inducing agent. Apparatus may be further included for assembling the cut plants into windrows.

In the drawings:

FIG. 1 is a fragmentary schematic perspective view of the apparatus constituting one embodiment of the invention for spraying and cutting plants in a field;

FIG. 2 is a fragmentary schematic side elevational view of certain components shown in FIG. 1 and particularly illustrates the action of such components in bending, spraying and cutting the plants in the field;

FIG. 3 is a schematic view, partly in side elevation from a mechanical standpoint and partly in block form from an electrical standpoint, of a second embodiment of the invention;

FIG. 4 is a schematic view, partly in side elevation from a mechanical standpoint, of a third embodiment of the invention; and FIG. 5 is a schematic view, partly in side elevation from a mechanical standpoint, of a fourth embodiment of the invention.

In one embodiment of the invention, material is provided for drying cut plants such as grass and alfalfa and other types of legumes. The material preferably includes a drying agent such as potassium carbonate. Preferably the potassium carbonate is in a solution with a suitable solvent such as water. The solution of potassium carbonate and water is applied to the cut plants in a concentration of approximately three (3) pounds to six (6) pounds per ton of dried cut plants. The concentration of the solution of the potassium carbonate applied to the plants is dependent upon the relative amount of moisture on and in the cut plants. This corresponds to a concentration by weight of potassium carbonate on the dried cut plants of 0.15% to 0.30%.

Preferably the drying agent such as potassium carbonate has a pH of about 11.7 in the solution. This value of pH is effective in causing the potassium carbonate to saponify the cuticular waxes on the stems of the cut plants, particularly as the pH of the potassium carbonate in solution on the cut plants increases. By saponifying such waves, the potassium carbonate facilitates the drying of the stems.

As the cut plants dry, the concentration of the potassium carbonates in the solution on the cut plants tends to increase. As will be appreciated, an excessive concentration of the potassium carbonate on the cut plants is undesirable because it tends to scorch the cut plants. For example, when the pH of the drying agent in the solution on the plants becomes as high as approximately 14, the plants tend to become chemically burned. Potassium carbonate is desirable in this respect because the potassium carbonate becomes at least partially insoluble in a solution at a pH of approximately 13.4. This causes the potassium carbonate to become at least partially removed from the cut plants as the plants become dried. In this way, the pH of the potassium carbonate is automatically regulated at a safe value.

Potassium carbonate is desirable because it may be contacted and ingested safely by human beings and animals. Other materials may also be safely used as drying agents. For example, a combination of approximately ten percent (10%) by weight of sodium hydroxide (NaOH) and ninety percent (90%) by weight of sodium carbonate ($Na_2CO_3$) or sodium bicarbonate ($NaHCO_3$) may also be used. Trisodium phosphate ($Na_3PO_4$), sodium orthosilicate ($Na_3SiO_4$) and sodium metasilicate ($Na_2SiO_3$) may also be used.

A material for facilitating the penetration of the drying agent into the cut plants may also be used. Such material may be considered as a surface active agent and a wetting agent for the drying agent. For example, an alkyl aryl polyether alcohol such as that designated by Rohm and Haas by the trademark "Triton B1956" may be mixed with the drying agent. This alcohol tends to thicken the water layer on the cut plants and constitutes a non-ionic wetting agent for the drying material such as potassium carbonate. The alcohol may have a concentration to approximately one (1) pint per one hundred (100) gallons of spray. Other materials such as that designated as Monawet 70E or that designated as Monafax L-10 may also be used. Both of these materials are supplied by Mona Industries of Patterson, N.J. The material designated as Monawet 70E constitutes a sodium dioctylsulfosuccinate. The surface active agent is advantageous because it tends to reduce the surface tension on the plants below a particular value such as approximately 55 dynes per centimeter. It is desirable that the pH of the surface active material in the solution be compatible with the pH range in which the drying agent and the other materials in this invention are functioning.

A material such as sodium propionate is also included for inhibiting the molding of the cut plants, particularly the leafy portions of the cut plants. The sodium propionate may have a concentration of approximately two and one half pounds (2½ lbs.) to five pounds (5 lbs.) per ton of the dried cut plants. This corresponds to a concentration of the sodium propionate of approximately 0.125% to 0.250% by weight of the dried cut plants. The concentration of the sodium propionate on the cut plants depends upon the moisture on the plants. Sodium propionate is desirable because it is safe when it is ingested or contacted by human beings or animals.

Sodium propionate is inactive chemically and is also relatively non-volatile when it has a pH of at least 6. This will cause the sodium propionate to remain inactive chemically during the drying operation because the pH of the drying agent in the solution is considerably in excess of 6. However, the cut plants ferment as a precursor to molding. Since fermentation is an acidic process, the pH of the solution will decrease. This will cause the sodium propionate to become active chemically when the pH of the solution on the plants decreases below a value of approximately 6. As a result, the propionate acts as a fungicide in inhibiting the molding of the cut plants, particularly the leaves on the cut plants. The propionate acts as a fungicide in part because it constitutes a fatty acid.

Other materials may be used as mold inhibitors in addition to sodium propionate. For example, other propionate salts such as ammonium propionate and calcium propionate may also be used. However, calcium propionate may tend to react with the potassium carbonate to form calcium carbonate, which may precipitate. Furthermore, salts of other fatty acids such as sorbic and carboxylic acids or salts such as acetic acid or sodium or potassium acetate may also be advantageous. Propylene glycol may also be advantageous, particularly when used with sodium propionate, because it constitutes a good fungus inhibitor and tends to facilitate the saponification of the stems of the plants and to facilitate the withdrawal of water from the plants.

Other materials may also be used as a mold inhibitor. For example, a 2 N-octyl 4-isothiazolin-3-1 may be used as the mold inhibitor. Such a material is supplied by Rohm & Haas. Such a material may be used in a concentration of approximately 0.005 pounds to 0.25 pounds per ton of dried cut plants.

When the concentration of the solution containing the drying agent and the mold inhibiting agent is varied, changes do not have to be made in the amount of the drying agent and the mold inhibiting agent per pound of dried harvested crop. This results from the fact that changes in concentration per pound of cut plants can be inversely related to the rate at which the material is applied. For example, when the concentration of the material in the solution is increased because the amount of moisture on the cut plants has increased, the rate of applying the material to the plants can be decreased because the material is diluted by the moisture on the plants. For normal conditions of humidity, the amount of water used as the solvent in the solution is about twenty (20) gallons per ton of dried plants. This corresponds to a concentration of approximately 2.7% of the propionate by weight in the solution.

The drying of alfalfa (legume) may be expressed by the following equation:

$$dM/dt = K_1(M - M_e)a_s b_L C.$$

where

M = moisture content;
M = equilibrium moisture content = 0.279 Exp (−0.5395);
L = leaf: stem ratio; and
S = saturation deficit (KPa), a function of humidity.

These relationships have not remained invariant under different field conditions. For example, if there are relatively large air spaces between the various forage stems and leaves, the cut plants may dry relatively quickly and uniformly so that S will assume the value of the outside atmosphere. If the stems and leaves are packed closely together, air circulation will be reduced. This will cause the value of S to be relatively small. The air spaces also become reduced when the forage starts to decay before it is dry. This results from the fact that the forage tends to soften as it decays, so that air spaces are reduced. In view of the above, it is important to decrease the drying time constant and to inhibit the decaying process.

The material of this invention is applied to the plants after the plants have been bent. By bending the plants, the material can be applied as a spray along the full length of the stems and on the leaves. The plants are cut at a position near the stem and the cut plants may then be brought together to define a windrow. The windrow is preferably high and loosely packed to facilitate the circulation of air through the windrow. In this way, the drying of the plants is facilitated. Alternatively, the cut plants may be laid flat on the ground. If desired, the cut plants may be manually assembled into loose packs constituting the equivalent of windrows.

Under ordinary circumstances, a period as long as four (4) days, and sometimes even longer, is required to dry cut plants such as grass or alfalfa. Such a long period of time is undesirable for several reasons. One reason is that weather is unpredictable. As a result, as the time required to dry the cut plants is increased, the possibility of rain during that time increases. Furthermore, the tendency for the cut plants to mold or decay increases as the time required for the drying increases. The cut plants also tend to respire as they lie in the fields and they tend to lose nutrients as they respire.

The materials of this invention tend to dry the cut plants such as alfalfa and other types of legumes in a period of less than two (2) days. During the drying, molding of the cut leaves is inhibited. This is important in preserving the leaves on the cut plants. Since the leaves provide more nutrients than the stems, the preservation of the leaves on the plants is highly advantageous. The relatively fast drying also minimizes respiration of the plants and accordingly preserves the nutrients in the plants.

The cut plants in each window are preferably turned approximately an hour before being baled. When the cut plants are turned, the cut plants at the bottom of the windrow now appear at the top of the windrow. This gives these cut plants an opportunity to be dried. This is desirable because the cut plants near the bottom of the window tend to accumulate moisture such as from the dew on the ground.

Even under optimum conditions such as turning the windrow about an hour before baling, there is a moisture variation of about four percent (4%) to five percent (5%) within a bale. In a well packed bale, the moisture does not equalize significantly within the curing interval. As a result, a high moisture volume of several cubic inches will remain so during the curing process. Although hay of a moisture level of a substantially uniform twenty one percent (21%) may be mold-free, hay with an average moisture level of approximately twenty percent (20%) and peak moisture regions of approximately twenty five percent (25%) can develop pockets of spoilage. This indicates the importance of including the mold inhibiting agent with the drying agent.

Suitable apparatus for applying the material to the plants is shown in FIG. 1. Such apparatus includes a movable vehicle generally indicated at 10. The apparatus includes at least one push bar 12 attached to the vehicle 10 for bending the plants in the direction of movement of the vehicle, this direction being indicated by an arrow 14. The push bar 12 may be disposed at a suitable distance such as approximately one (1) foot above the ground.

When the plants 16 to be cut are relatively short, the push bar 12 may be sufficient. However, when the plants 16 are relatively tall, an additional push bar 18 may be provided. The push bar 18 may be disposed above and forwardly of the push bar 12 in the direction 14 of movement of the vehicle. It will be appreciated that additional push bars may be provided if needed or desired.

A spray bar 20 is disposed above and rearwardly of the push bars 12 and 18. The spray bar 20 may be provided with nozzles 22 at spaced positions in the lateral direction. The nozzles 22 in the spray bar 20 are disposed to direct the solution in a spray 24 along the length of the plant stem and on the leaves of the plant. The spray 24 may be obtained from a storage container 25.

A cutter bar 26 is disposed rearwardly of the spray bar 20 at a position near the bottom of the plant stems. An auger 28 may be disposed rearwardly of the cutter bar 26 to collect the cut plants in a high, loosely packed windrow 30. The auger 28 also tends to spread any excess solution along the stems and leaves of the plants. The auger 28 may be constructed in a conventional manner. Rollers 32 also tend to squeeze the cut plants to force air and water out of the plants and to facilitate the replacement of such disposed fluids with the solution of this invention as the plants expand after being squeezed. This enhances the action of the drying agent and the mold inhibiting agent of this invention.

The rate of application of the spray 24 to the plants 16 depends upon the concentration of the solution and the rate at which the plants are cut. Since the solution is applied through spray nozzles 22, the nozzle sizes will determine the actual flow rate.

The formula for determining the nozzle flow may be expressed as follows:

$$\text{Flow rate} = \frac{\text{crop density} \times \text{vehicle speed} \times \text{application ratio}}{\text{solution concentration} \times \text{nozzle spacing density}}$$

For example, with a concentration of 3.3% by weight of the drying agent, a vehicle speed of four hundred feet (400') per minute, a nozzle spacing of one half foot (0.5'), a crop density of two (2) tons per acre and a desired application ratio of five (5) pounds of drying agent per ton of crop, the nozzle flow rate should be approximately twenty one hundredths (0.21) gallons per minute per nozzle.

The nozzle flow rate may be precisely controlled as on a digital basis. For example, a second spray bar 40 may be provided with nozzles 42. The nozzles 42 may have an opening one half the size of the openings 22 in the spray bar 20. A valve 44 may be associated with the spray bar 40 to control the flow of the solution through the spray bar. Similarly, a valve 46 may be associated with the spray bar 20 to control the flow of fluid through the spray bar.

Flip-flops 48 and 50 may be respectively associated with the valves 44 and 46. The triggering of the flip-flops 48 and 50 to the true state respectively opens the valves 44 and 46. A triggering of the flip-flops 48 and 50 to the false states respectively closes the valves 44 and 46. By triggering the flip-flops 48 and 50 selectively to the true state, the rate of flow of the solution through the nozzles may be controlled at twenty five percent (25%), fifty percent (50%), seventy five percent (75%) and one hundred percent (100%) of full flow. Furthermore, the addition of other spray bars with nozzles of progressively decreasing size will produce further digital refinements in the rate of flow.

As previously described, the leaves of the plants 16 tend to mold easier than the stems. Furthermore, the leaves of the plants 16 tend to dry faster than the stems. In view of this, a different solution may be applied to the leaves than to the stems. This may be obtained by providing a pair of storage containers 60 and 62 and a pair of spray bars 64 and 66. The spray bars 64 and 66 are respectively coupled to the storage containers 60 and 62. The container 60 may hold a solution primarily formed from the drying agent, and the spray bar 64 may direct this solution primarily to the stems. The container 62 may hold a solution primarily formed from the mold inhibiting agent, and the spray bar 66 may direct the solution primarily to the leaves.

Apparatus may be included for controlling the rate at which the material of this invention is applied to the plants. Such apparatus may include a pressure sensor such as a panel 70 which is disposed adjacent the push bar 12 to sense the force of the plants on the push bar. This force is indicative of the volume of the cut plants per unit of area. This force is converted to an electrical signal which is applied to a control mechanism 72. The control mechanism 72 in turn varies the rate at which the solution from a container 74 flows through a spray nozzle 76. A similar arrangement may be associated with the push bar 18 to control the rate at which spray from a container 78 flows through a nozzle 80.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. A method of drying plants having stems and leaves, including the following steps:

providing a solution containing a mixture of a drying agent and a mold inhibiting agent with properties to obtain a drying of moisture on the plants and in a concentration dependent upon the amount of moisture to be dried on the plants by the drying agent and the mold inhibiting agent, the drying agent providing a basic pH in the solution and having properties of becoming at least partially insoluble at a pH in the solution no greater than approximately 13.4, the mold inhibiting agent having properties of remaining inactive for different pH conditions in the solution until the occurrence in the plants of particular acidic conditions inducing molding in the plants and having properties of reacting with moisture under such particular acidic conditions in the plants to inhibit the molding of the plants, bending the plants to provide for a spraying of the solution along the lengths of the stems of the plants and on the leaves of the plants, spraying the solution along the lengths of the plants and on the leaves of the plants after the bending of the plants, and cutting the plants after the spraying of the solution along the lengths of the plants and on the leaves of the plants.

2. The method set forth in claim 1, including the step of:

collecting the cut plants in loosely packed windrows to provide for the drying of the plants.

3. The method set forth in claim 2, including the step of:

baling the windrows after the moisture has been dried from the plants, and turning the plants in the windrows over shortly before the baling operation.

4. The method set forth in claim 1, including the step of:

determining the mass of the plants being sprayed at each instant by the solution containing the mixture of the drying agent and the mold inhibiting agent, and adjusting the rate at which the solution is being directed to the plants at each instant in accordance with the mass of the plants being sprayed at that instant.

5. The method set forth in claim 1 wherein the solution constitutes a first solution primarily containing the drying agent and secondarily containing the mold inhibiting agent and a second solution primarily containing the mold inhibiting agent and secondarily containing the drying agent and the first solution is directed primarily at the stems of the plants and the second solution is directed primarily at the leaves of the plants.

6. A method of drying plants having stems and leaves, including the following steps:

providing a first solution primarily containing a drying agent and secondarily containing a mold inhibiting agent and having properties of drying moisture on the stems of the plants, the drying agent and the mold inhibiting agent being provided in the solution in a concentration to obtain the drying of the moisture on the stems of the plants, providing a second solution containing the drying agent and the mold inhibiting agent and primarily containing the mold inhibiting agent, the combination of the drying agent and the mold inhibiting agent in the second solution having properties of drying, and being in a concentration to dry, moisture on the leaves of the plants, the drying agent providing a basic pH in the solutions and having properties of becoming at least partially insuluble at a pH no greater in the solutions that approximately 13.4, the mold inhibiting agent mixed with the drying agent having properties of remaining inactive for different pH conditions in the solutions until the occurrence in the plants of particular acidic conditions inducing molding of the plants and having properties of reacting with moisture in the plants under such particular acidic conditions to inhibit molding of the plants, bending the plants to provide for a spraying of the first solution on the stems of the plants and a spraying of the second solution on the leaves of the plants, spraying the first solution primarily on the stems of the plants and the second primarily on the leaves of the plants while the plants are bent, and cutting the plants after the spraying operation.

7. A method as set forth in claim 6 wherein the second solution contains a higher concentration of the mold inhibiting agent than the first solution.

8. A method as set forth in claim 6, including the following step:
collecting the cut plants in loosely packed windrows to provide for the drying of the plants.

9. A method as set forth in claim 7 including the following steps:
collecting the cut plants in loosely packed windrows to provide for the drying of the plants,
baling the windrows after the plants have been dried to a particular moisture content by the first and second solutions, and
turning the plants in the windrows over shortly before the baling operation.

10. A method as set forth in claim 6, including the step of:
squeezing the plants after the spraying, and after the cutting, to force water and air out of the plants and to replace such water and air with the first and second solutions.

11. A method as set forth in claim 1, including the step of:
squeezing the plants after the spraying and cutting operations to force water and air out of the plants and to replace such water and air with the solution containing the mixture of the drying agent and the mold inhibiting agent.

12. A method as set forth in claim 1, including the step of:
sensing the pressure exerted by the plants at each instant during the bending of the plants, and
controlling at each instant the rate at which the solution containing the mixture of the drying agent and the mold inhibiting agent is sprayed on the plants in accordance with the pressure exerted by the plants at that instant during the bending of the plants.

13. A method of drying plants, including the steps of:
providing first and second solution each containing a mixture of a drying agent and a mold inhibiting agent,
the mixture of the drying agent and the mold inhibiting agent in the first solution having properties of drying moisture on the leaves of the plants and being disposed in the first solution in a concentration dependent upon the amount of moisture to be dried on the leaves of the plants by the mixture of the drying agent and the mold inhibiting agent in the first solution, the mixture of the drying agent and the mold inhibiting agent in the second solution having properties of saponifying the wax on the stems of the plants,
the drying agent providing a basic pH in the solutions and being selected from the group consisting of the carbonates, phosphates and silicates of at least one of sodium and potassium and a combination of the hydroxides, carbones and bicarbonates of at least one of sodium and potassium,
the mold inhibiting agent being selected from the group consisting of acids and acid salts of at least one of propionic, sorbic, acetic and carboxylic acids,
positioning the plants to provide for a spraying of the solutions along the lengths of the plants,
spraying the first solution on the leaves of the plants and spraying the second solution along the stems of the plants, and
cutting the plants after the spraying.

14. A method as set forth in claim 13 wherein the drying agent in each of the first and second solutions has a concentration of about 3 to 6 pounds per ton of dried cut plants and the mold inhibiting agent has a concentration about 2.5 to 5 pounds per ton of dried cut plants.

15. A method as set forth in claim 6 wherein the drying agent in the second solution has a concentration providing a pH of at least 11 on the stems of the plants.

16. A method of drying plants, including the steps of:
providing a solution containing a mixture of a drying agent and a mold inhibiting agent in a concentration dependent upon the amount of moisture on the plants,
positioning the plants to provide for a spraying of the solution along the lengths of the plants,
spraying the solution along the lengths of the plants, and
cutting the plants after the spraying,
the drying agent providing a basic pH in the solution and being selected from a group consisting of the carbonates, phosphates and silicates of at least one of sodium and potassium and a combination of the hydroxides and carbonates or bicarbonates of at least one of sodium and potassium and the mold inhibiting agent having properties of remaining inactive for different pH conditions in the plants until the occurrence in the plants of particular acidic conditions inducing molding of the plants and having properties of reacting with moisture in the plants under such particular acidic conditions in the plants to inhibit molding of the plants.

17. A method as set forth in claim 13 wherein the solution also includes a surface active agent.

18. A method of drying plants, including the steps of:
providing a solution containing a mixture of a drying agent and a mold inhibiting agent in a concentration dependent upon the amount of moisture on the plants,
spraying the solution along the lengths of the plants, and
cutting the plants after the spraying,
the drying agent providing a basic pH of at least 11 and having properties of becoming at least partially insoluble in the plants at a pH in the plants no greater than approximately 13.4 and the mold inhibiting agent having properties of remaining inactive for different pH conditions in the plants until the occurrence in the plants of particular acidic conditions inducing molding of the plants and having properties of reacting with moisture under such particular acidic conditions in the plants to inhibit molding of the plants.

19. A method as set forth in claim 18 wherein the drying agent has a concentration in the range of approximately three pounds (3 lb) to six pounds (6 lb) per ton of the dried cut plants.

20. A method as set forth in claim 19 wherein the mold inhibiting agent has a concentration in the range of approximately two and one-half pounds (2½ lb) to five pounds (5 lb) per ton of dried cut plants.

21. A method as set forth in claim 20 wherein the drying agent is a carbonate and the mold inhibiting agent is a propionate.

22. A method as set forth in claim 13, including the steps of:
collecting the cut plants in loosely packed windrows to provide for the drying of the cut plants,
baling the windrows after the plants have been dried by the mixture of the drying agent and the mold inhibiting agent, and
turning the windrows over relatively shortly before the baling operation.

23. A method as set forth in claim 1 wherein the drying agent is selected from a group consisting of the carbonates, phosphates and silicates of at least one of sodium and potassium and a combination of the hydroxides and carbonates or bicarbonates of at least one of sodium and potassium and the mold inhibiting agent is an acid salt of a carboxylic acid.

24. A method as set forth in claim 1 wherein the solution includes a surface action agent.

25. A method of drying plants, including the steps of:
providing a solution containing a mixture of a drying agent and a mold inhibiting agent, the mixture of the drying agent and the mold inhibiting agent having properties of drying moisture on the plants, the mixture of the drying agent and the mold inhibiting agent being provided in the solution in a concentration to dry the moisture on the plants,
the drying agent providing a basic pH in the solution and being selected from the group consisting of the carbonates, phosphates and silicates of at least one of sodium and potassium and a combination of the hydroxides, carbonates and bicarbonates of at least one of sodium and potassium,
the mold inhibiting agent being selected from the group consisting of acids and acid salts of at least one of propionic, sorbic, acetic and carboxylic acids,
positioning the plants to provide for a spraying of the solution along the lengths of the plants,
spraying the plants to provide for a concentration of the drying agent and the mold inhibiting agent on the plants dependent upon the amount of moisture on the plants,
cutting the plants after the spraying, and
collecting the cut plants in loosely packed windrows to provide for the drying of the cut plants.

26. A method of drying plants, including the steps of:
providing a solution containing a mixture of a drying agent and a mold inhibiting agent,
positioning the plants to provide for a spraying of the solution along the lengths of the plants,
spraying the plants to provide for a concentration of the drying agent and the mold inhibiting agent on the plants dependent upon the amount of moisture on the plants,
cutting the plants after the spraying, and
collecting the cut plants in loosely packed windrows to provide for the drying of the cut plants,
the drying agent providing a basic pH in the solution and being selected from a group consisting of the carbonates, phosphates and silicates of at least one of sodium and potassium and a combination of the hydroxides and carbonates or bicarbonates of at least one of sodium and potassium and the mold inhibiting agents having properties of remaining inactive for different pH conditions in the plants until the occurrence in the plants of particular acidic conditions inducing molding of the plants and having properties of reacting with moisture in the plants under such particular acidic conditions in the plants to inhibit the molding of the plants.

27. A method as set forth in claim 26 wherein the mold inhibiting agent is selected from a group consisting of an acid and an acid salt of one of propionic acid, sorbic acid, acetic acid and carboxylic acid.

28. A method as set forth in claim 25 wherein the solution includes a surface active agent.

29. A method as set forth in claim 28 wherein the drying agent provides a basic pH of at least 11 in the plants and has properties of becoming at least partially insoluble at a pH in the plants no greater than approximately 13.4.

30. A method as set forth in claim 29 wherein the drying agent has a concentration in the range of approximately three pounds (3 lb) to six pounds (6 lb) per ton of the dried cut plants and the mold inhibiting agent has a concentration in the range of approximately two and one-half pounds (2½ lb) to five pounds (5 lb) per ton of dried cut plants.

31. A method as set forth in claim 30, including the steps of:
baling the windrows after the plants have been dried by the mixture of the drying agent and the mold inhibiting agent, and
turning the windrows over shortly before the baling operation.

* * * * *